(No Model.) 3 Sheets—Sheet 1.
M. L. JACOBY.
PROPULSION GEARING FOR BICYCLES.
No. 516,933. Patented Mar. 20, 1894.
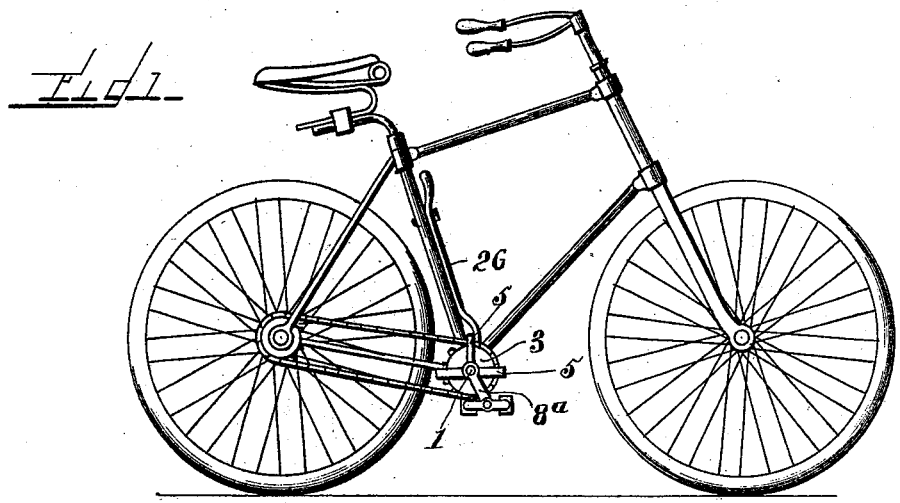
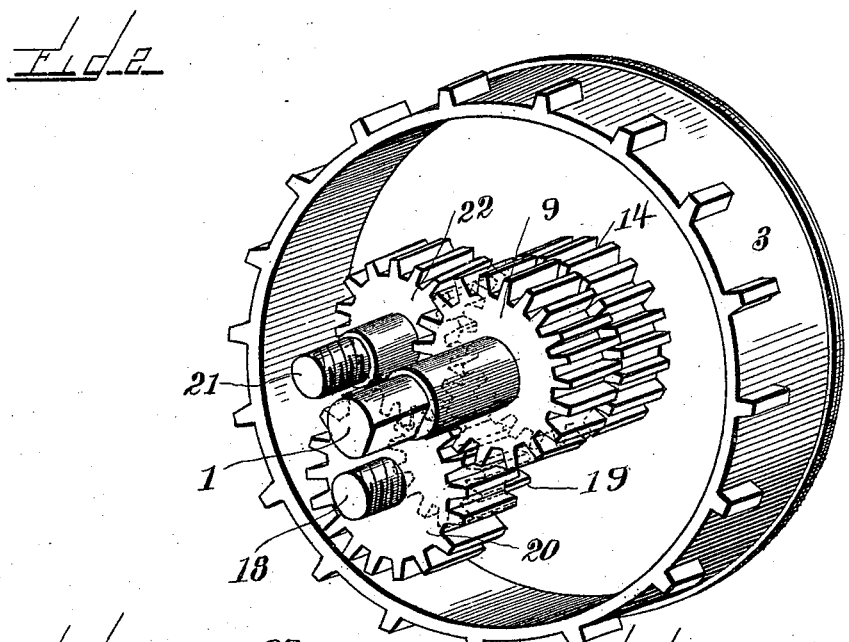
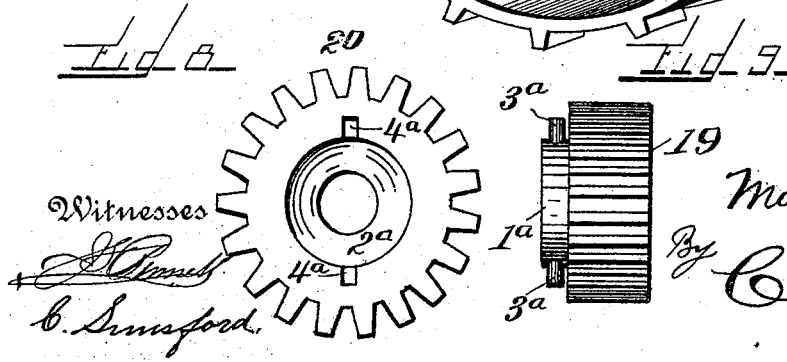
Witnesses
Inventor
Mahlon L. Jacoby
By C. T. Belt
Attorney

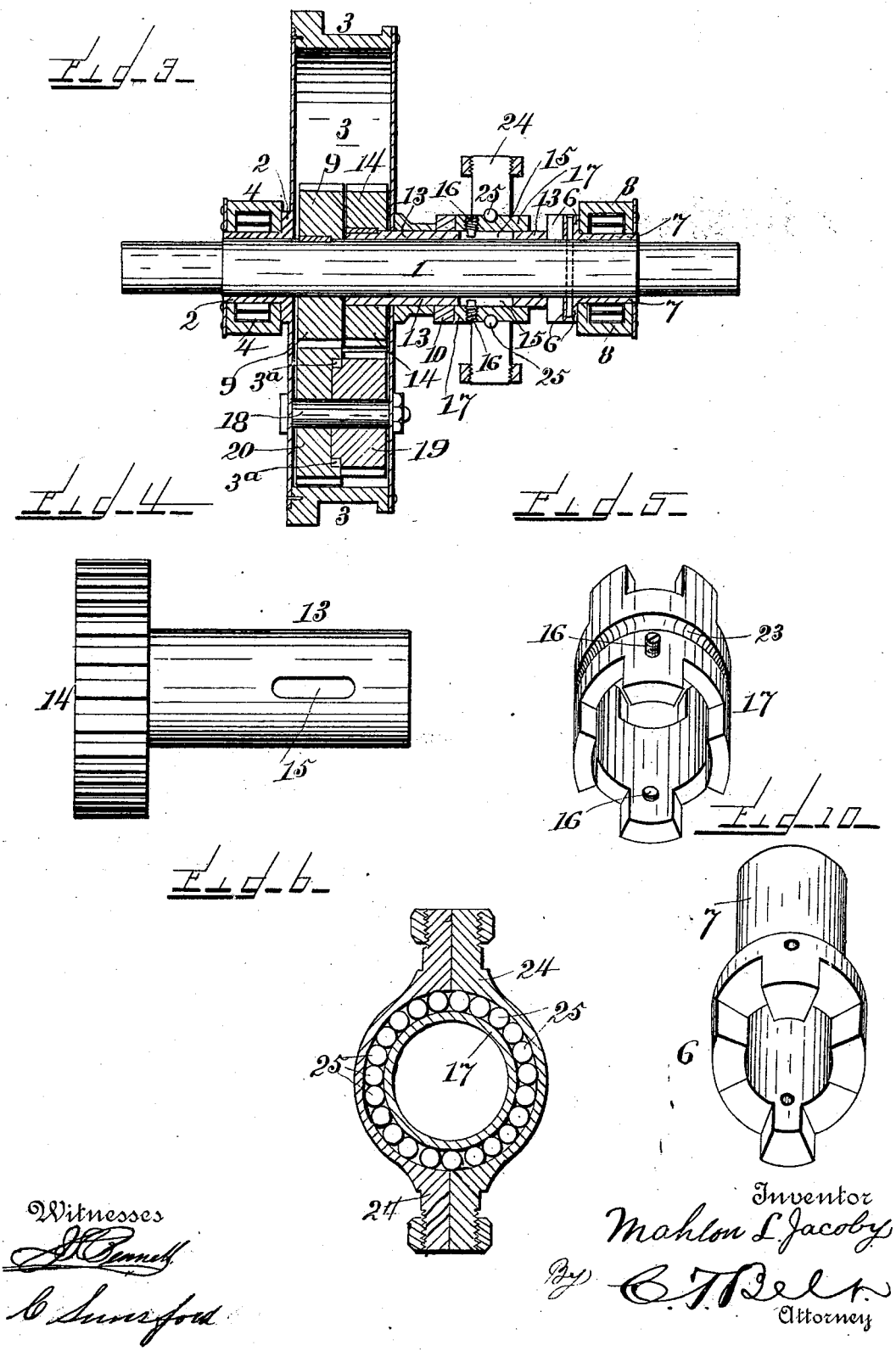

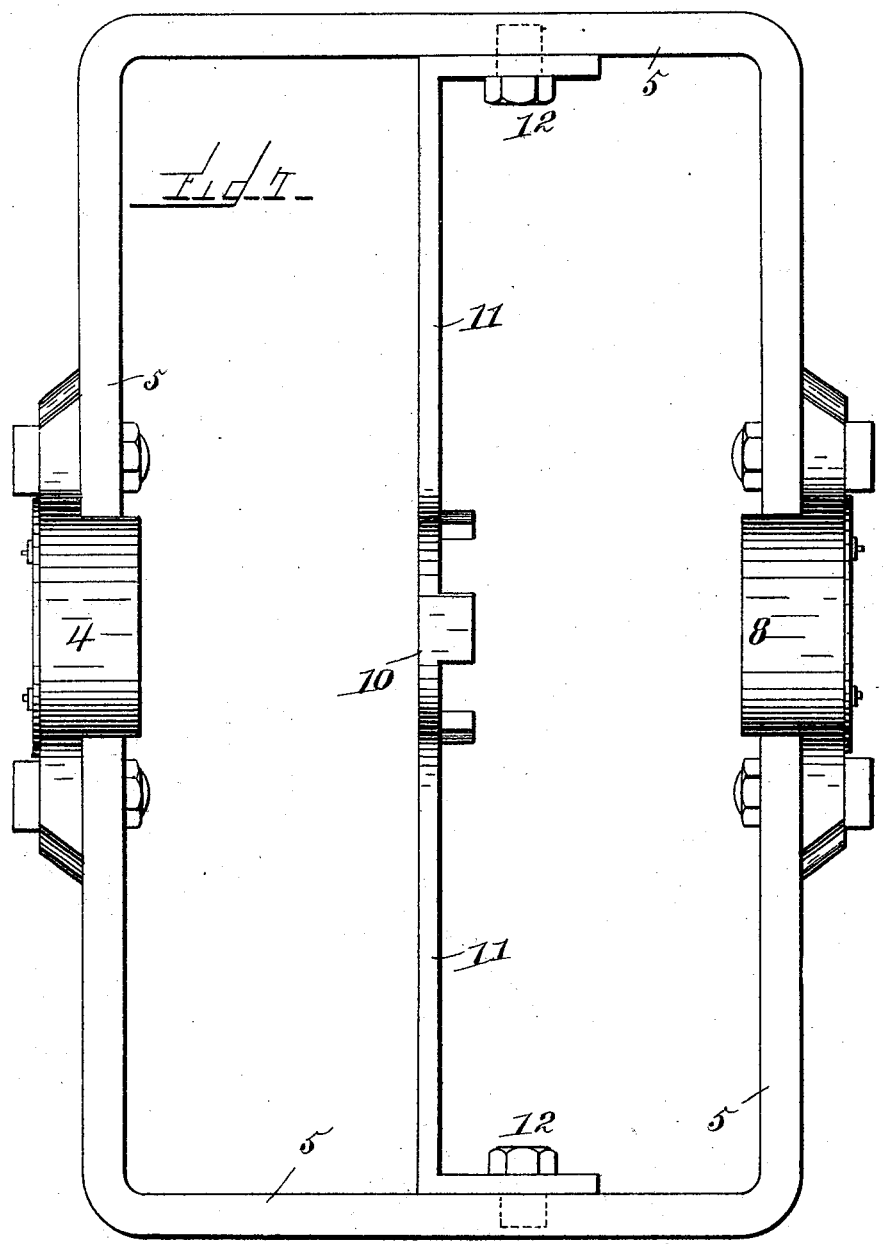

UNITED STATES PATENT OFFICE.

MAHLON L. JACOBY, OF READING, PENNSYLVANIA.

PROPULSION GEARING FOR BICYCLES.

SPECIFICATION forming part of Letters Patent No. 516,933, dated March 20, 1894.

Application filed October 18, 1893. Serial No. 488,451. (No model.)

*To all whom it may concern:*

Be it known that I, MAHLON L. JACOBY, a citizen of the United States, residing at Reading, in the county of Berks and State of Pennsylvania, have invented certain new and useful Improvements in Propulsion Gearing for Bicycles, of which the following is a specification.

This invention relates to bicycles, and particularly to the class of propulsion, and the object of the invention is to provide means for running a bicycle at high or low speed.

A further object of the invention is to provide means for propelling a bicycle at a high speed upon a level road, and for increasing the power of the crank shaft for hill climbing, rough roads, &c.

A still further object of the invention is to provide means for changing the action of the propelling mechanism, from the wheel seat, while the machine is in motion.

The invention consists in a novel means to enable a bicycle to be given a fast speed, or a speed of great power.

The invention also consists in certain peculiar and novel features of construction and arrangement, as will be hereinafter fully described and set up in the claims.

In the accompanying drawings forming part of this application—Figure 1 is a side elevation of a bicycle embodying my invention; Fig. 2 a perspective view of the series of gear wheels, with the sprocket wheel, in which they are housed, partly broken away. Fig. 3 is a longitudinal sectional view of the crank shaft and the parts upon it. Fig. 4 is a detached view of the slidable sleeve and its gear wheel. Fig. 5 is a detached perspective view of the clutch. Fig. 6 is a sectional view of the clutch and its ball bearing yoke. Fig. 7 is an enlarged plan view of the frame 5. Fig. 8 is a plan view of the inner end of the gear wheel 20. Fig. 9 is a side elevation of the gear wheel 19. Fig. 10 is a perspective view of the notched ring.

The same reference numerals denote the same parts throughout the several figures.

Referring to the drawings, the crank shaft 1, is journaled directly at one end in one side of the hub 2, of the sprocket wheel 3, this side of the said hub being journaled in a ball bearing journal 4, upon one side of the frame 5. The other end of the shaft 1, has secured thereto a notched ring 6, having a sleeve 7, which is journaled in a ball bearing journal 8, upon the opposite side of the said frame 5, and the cranks $8^a$, to which the pedals are secured, are attached to the shaft 1, upon the outside of these ball bearing journals. The said shaft 1, is provided near the end opposite the notched ring 6, with a gear wheel 9, keyed thereon, and between this gear wheel 9, and the said notched ring, the latter forming one female clutch member, is another notched ring 10, being the other female clutch member, having arms 11, secured to the said frame 5, by bolts 12, and forming a middle support for the said shaft and a bearing for the sleeve 13, loosely secured upon the said shaft between the gear wheel 9, and the ring 6. The said sleeve 13, has keyed upon one end a gear wheel 14, while the other end has slots 15, into which a pin 16, passes for slidably securing the clutch 17, upon the sleeve. Secured rigidly together and mounted upon a spindle 18, in the sprocket wheel 3, are two gear wheels 19 and 20 respectively. These two wheels 19 and 20 are secured together by means of the hub $1^a$ of the wheel 19 extending into the socket $2^a$ of the wheel 20, and the lugs $3^a$, formed upon the hub $1^a$, being driven into the pockets $4^a$, of the socket $2^a$. Similarly mounted upon another spindle 21, is a gear wheel 22, which meshes with the gear wheel 14, and with the gear 19, while the gear 20, meshes with the gear wheel 9, upon the crank shaft. It will be observed that all the above mentioned wheels are housed, or inclosed in the sprocket wheel, not simply to protect them from dirt, dust, &c., but particularly, because it enables me to effect a construction and arrangement of simplicity as well as of great strength. The clutch 17, has an annular groove 23, and is journaled in a shifting yoke 24, having ball bearings 25. This yoke is made in halves, and may extend itself up to within convenient reach of the rider, or it may have a suitable lever connection 26 extending into close proximity to the seat.

One side of the sprocket wheel I make detachable, so that the interior of the wheel may be gotten at for any desired purpose.

The operation of my device is as follows: Should the rider be wheeling up hill and desire strong driving power, the clutch is thrown into engagement with the female member 10, which causes the gear wheels, 19, 20, 22, to revolve around the gear wheel 14, upon the sleeve 13, the latter being held rigid with the frame 11, by the said clutch action, leaving the sprocket free from the crank shaft and only revolved by the gearing. When a high speed is desired, the clutch is thrown into engagement with the member 6, which completely stops the action of all the said gear wheels, and leaves the sprocket wheel rigid with and to be turned only by the crank shaft.

Having thus described my invention, what I claim as new, and desire to secure by Letters Patent, is—

1. The combination with a bicycle, the sprocket wheel, and the crank shaft having a gear wheel fixed upon its end within the sprocket wheel, of the spindles secured to the sprocket wheel upon the inside, the set of gear wheels located upon the spindles, two of such wheels being joined together, the said fixed gear wheel upon the shaft meshing with one of the joined wheels, the gear wheel loosely mounted upon the shaft and operated by the other of the joined wheels meshing with another of the said set of wheels, and the clutch mechanism for connecting the sleeve gear wheel to the cycle frame, to increase the driving power, as set forth.

2. The combination with a bicycle and its crank shaft, of the sprocket wheel having a removable side, the slotted sleeve loosely mounted upon the shaft, the gear wheel secured to the sleeve, the gear wheel fixed upon the shaft, the set of gear wheels spindled to and inside the sprocket wheel, and the clutch mechanism connecting the sleeve with the shaft to increase the speed, as set forth.

3. The combination with the crank shaft, the gear wheel secured thereto, the sleeve loosely mounted upon the shaft, and the gear fixed to the sleeve, of the sprocket wheel, the spindles secured in the sprocket, the set of gear wheels located upon the spindles, two of such wheels being joined together, one of the latter wheels meshing with the shaft gear, and the other connected with the sleeve gear through another of the said set of gear-wheels and the clutch slidably secured upon the sleeve to connect it with the cycle frame, substantially as and for the purpose set forth.

4. The combination with the sprocket wheel having a shaft upon which is secured a gear wheel, of the slotted sleeve provided with a gear wheel, and loosely mounted upon the shaft, the set of gear wheels spindled in the sprocket wheel, two of the set being joined together one meshing with the shaft gear and the other connected with the sleeve gear through another of the said set of gear wheels and the clutch mechanism connecting the sleeve gear with the cycle frame, as and for the purpose set forth.

5. The combination with a bicycle, of the sprocket wheel, the set of gear wheels spindled upon the inside of the sprocket wheel, the shaft and its gear wheel, the sleeve and its gear wheel, and means for operating the set of gears either through the said sleeve or shaft, comprising the grooved clutch upon the sleeve, the notched ring secured to the shaft, forming one member of the clutch, and the notched portion of the frame forming the other clutch member, substantially as shown and described, and for the purpose set forth.

In witness whereof I hereunto set my hand in the presence of two witnesses.

MAHLON L. JACOBY.

Witnesses:
C. H. SCHAEFFER,
CAMERON E. STRAUSS.